Feb. 11, 1930. G. W. ELSEY 1,746,824

STRAP ANCHORING MEANS

Filed June 1, 1928

Patented Feb. 11, 1930

1,746,824

UNITED STATES PATENT OFFICE

GEORGE W. ELSEY, OF ANDERSON, INDIANA, ASSIGNOR, BY MESNE ASSIGNMENTS, TO DELCO PRODUCTS CORPORATION, OF DAYTON, OHIO, A CORPORATION OF DELAWARE

STRAP-ANCHORING MEANS

Application filed June 1, 1928. Serial No. 282,228.

This invention relates to improvements in anchoring devices.

It is among the objects of the present invention to provide a device adapted to secure one end of a flexible member and particularly a device for securing a strap to the end of a shock absorber operating arm.

Further objects and advantages of the present invention will be apparent from the following description, reference being had to the accompanying drawings, wherein a preferred embodiment of one form of the present invention is clearly shown.

Figure 1:
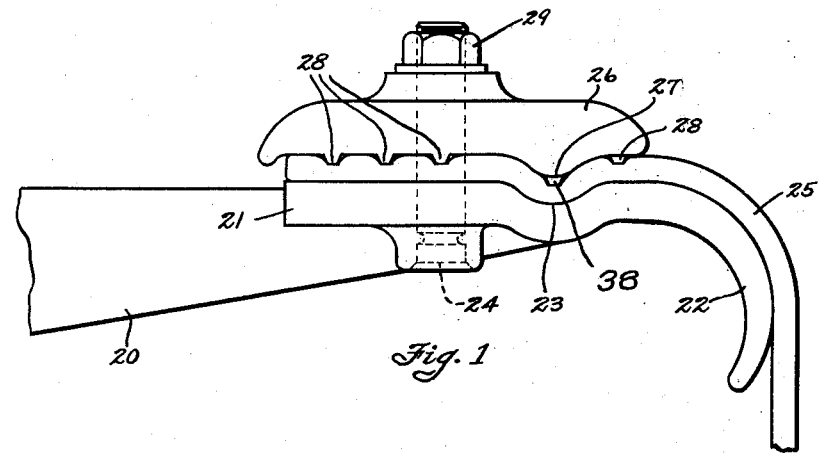
Fig. 1 is a fragmentary view showing the flexible member attached to the end of the shock absorber arm.
Figure 2:
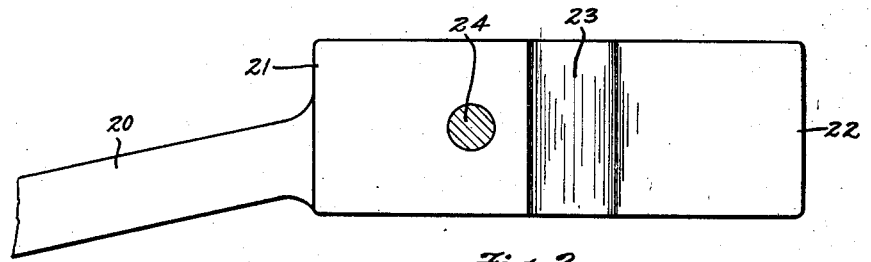
Fig. 2 is a plan view of the shock absorber arm shown in Fig. 1.
Figure 3:
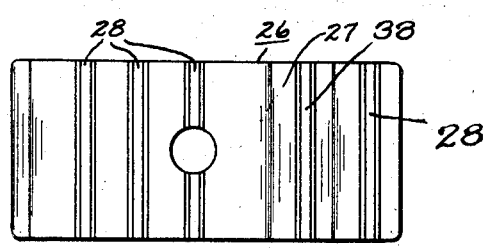
Fig. 3 is an inverted plan view of the complementary plate.

Referring to the drawings, the numeral 20 designates a shock absorber arm having a platform portion 21, the outer end of which is provided with a curved portion 22. In the upper surface of the platform there is provided a transverse recess designated by the numeral 23. A stud 24 shown in dotted lines in Fig. 1 is attached to the arm in any suitable manner and extends from the upper surface of the platform 21. A flexible strap 25 lies upon the pltaform portion 21 of the arm 20, the strap being perforated to fit over the stud 24. The clamping plate or complementary member 26 has a center opening which fits over the stud 24, the stud extending beyond the upper surface of the plate 26 when said plate is in proper position on the flexible member 25. On the surface of the plate 26, adjacent the flexible member, there is provided a transverse rib or hump 27 coinciding with the recess 23 when the plate 26 is in position on the arm. This hump bends the flexible member 25 so that it is forced into the recess 23. A plurality of spaced, transverse ribs 28 are formed on the bottom surface of the plate 26, one of said ribs 38 being provided on the highest part of hump 27. A nut 29 screw threadedly engages the stud 24, said nut, when tightened, presses the complementary plate 26 into clamping engagement with the flexible strap 25, the transverse ribs 28 and 38 of said plate biting into the flexible strap 25 and the hump 27, forcing said flexible strap into the recess 23.

By this construction the strap 25 is tightly clamped between the platform portion 21 of the arm 20 and the complementary plate 26, preventing longitudinal movement of the strap 25 relative to said platform portion and complementary plate, and thus relieving the tension which ordinarily would be exerted on the strap about the stud 24 if said transverse ribs and the hump 28, 38 and 27 respectively, were not provided.

This method of clamping flexible members to an arm reduces the possibility of tearing of the flexible member when stresses are exerted thereon, the clamping effect distributed over a substantially large area, thus protecting the strands of the flexible member, which are usually made of fibrous cords, from being severed.

While the form of embodiment of the present invention as herein disclosed, constitutes a preferred form, it is to be understood that other forms might be adopted, all coming within the scope of the claims which follow.

What is claimed is as follows:

1. A device of the character described, comprising in combination, a part having a platform portion; a transverse depression in said platform portion; a complementary member having a transverse hump adapted to coincide with the depression; a transverse rib provided on the highest portion of said hump; a flexible strap member having its one end interposed between the platform on said part and the complementary member; and means for drawing the complementary member against the part securely to clamp the flexible strap between said complementary member and the platform on the part.

2. A device of the character described, comprising in combination, a part having a platform portion; a transverse depression in said platform portion; a complementary member having a transverse hump adapted to coincide with the depression in the platform; a plurality of spaced, transverse ribs on said complementary member, one of said ribs being provided on the highest portion of said hump; a flexible instrumentality having one end interposed between the platform and the complementary member; and clamping means adapted to clamp the said complementary member and the platform into gripping engagement with the flexible instrumentality.

In testimony whereof I hereto affix my signature.

GEORGE W. ELSEY.